US009213860B2

(12) United States Patent
Everett et al.

(10) Patent No.: US 9,213,860 B2
(45) Date of Patent: Dec. 15, 2015

(54) SYSTEM, METHOD, AND DATABASE FOR PERSONAL INFORMATION MANAGEMENT WITH ADVANCED ACCESS CONTROLS

(76) Inventors: James Kenneth Everett, Farmingville, NY (US); Alexander J Turipe, Tampa, FL (US); Jody F. Fameree, Seffner, FL (US)

(*) Notice: Subject to any disclaimer, the term of this patent is extended or adjusted under 35 U.S.C. 154(b) by 0 days.

(21) Appl. No.: 13/226,472

(22) Filed: Sep. 6, 2011

(65) Prior Publication Data

US 2013/0262514 A1   Oct. 3, 2013

Related U.S. Application Data

(60) Provisional application No. 61/380,149, filed on Sep. 3, 2010.

(51) Int. Cl.
*G06F 21/62* (2013.01)

(52) U.S. Cl.
CPC ........ *G06F 21/6245* (2013.01); *G06F 21/6227* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 6,970,836 B1 * | 11/2005 | Paltenghe et al. | ............... 705/18 |
| 7,062,500 B1 | 6/2006 | Hall et al. | |
| 7,424,437 B2 | 9/2008 | Maus et al. | |
| 2003/0208490 A1 | 11/2003 | Larrea et al. | |
| 2006/0290135 A1 * | 12/2006 | Altman | ........................ 283/66.1 |
| 2007/0244899 A1 | 10/2007 | Faitelson et al. | |
| 2008/0082782 A1 * | 4/2008 | Meijer et al. | ................... 711/207 |
| 2009/0025090 A1 * | 1/2009 | Clement et al. | ................... 726/28 |
| 2009/0083544 A1 | 3/2009 | Scholnick et al. | |
| 2009/0089082 A1 * | 4/2009 | Heckerman et al. | ............... 705/2 |
| 2009/0228714 A1 | 9/2009 | Fiske et al. | |
| 2011/0035421 A1 * | 2/2011 | Laird-McConnell et al. | 707/822 |
| 2011/0040985 A1 * | 2/2011 | Tsuchiya | ....................... 713/190 |
| 2012/0047055 A1 * | 2/2012 | Aiello | .............................. 705/35 |

OTHER PUBLICATIONS

Code Amber Alertag, How It Works, Jan. 11, 2010.*
Dodge, Does delete forever in Gmail really mean it, Nov. 19, 2009.*
Newman et al. Scalable Semantics—the Silver Lining of Cloud Computing. eScience, 2008. eScience'08. IEEE Fourth International Conference on. IEEE, 2008.*

(Continued)

*Primary Examiner* — William Spieler
(74) *Attorney, Agent, or Firm* — Phillips Lytle LLP; David L. Principe

(57) ABSTRACT

A database for online personal information management comprising: a first account; a first database user id; a second database user id, the second database user id being associated with the first account; a set of data nodes, the nodes being interlinked to form a graph; a data object having an associated node, the associated node being one node in the set of data nodes; an associated account; an object owner; at least one share right object associated with a node, the share right object having a parameter indicating whether the share right object is active when the owner is alive or when the object owner is deceased.

30 Claims, 19 Drawing Sheets

(56) References Cited

OTHER PUBLICATIONS

Rosenwald, After death, Web sites help wrap up virtual lives, Washington Post, Jan. 24, 2010.*

Enterprise Networking Planet, Build a Secure FTP Dropbox with vsftpd, Nov. 10, 2004, accessed Nov. 7, 2014 at http://www.enterprisenetworkingplanet.com/netsecur/article.php/10952_3434071_2/Build-a-Secure-FTP-Dropbox-with-vsftpd.htm.*

* cited by examiner

Emergency Medical Report for John Doe

Address:

Legal Name:
Birthdate:
Current Age:
Most Recent Weight:
Blood Type:

Report Sections:
- Current Allergies
- Past Allergies
- Current Conditions
- Past Conditions
- Current Medications
- Surgeries
- Doctor's Visits
- Doctor's Information
- People to Be Contacted

Current Allergies
Allergy:
Date of Onset:

Past Allergies
Allergy:
Discharge Plan:
Date of Onset:

Current Conditions
Condition:          High Cholesterol

My Personal Datasafe

Online Chat | Logout

FIG. 19

SYSTEM, METHOD, AND DATABASE FOR PERSONAL INFORMATION MANAGEMENT WITH ADVANCED ACCESS CONTROLS

CROSS REFERENCE TO RELATED APPLICATIONS

The present application claims the benefit of U.S. Provisional Application No. 61/380,149, filed Sep. 3, 2010, which is hereby incorporated by reference.

TECHNICAL FIELD

The present invention relates to methods for managing personal information online, and more particularly, to a method of providing online personal information management with customizable access to multiple users.

BACKGROUND ART

There are a number of known methods for online data storage. For example, legacylocker.com provides a service directed to providing an online backup of passwords, documents, and other important information. Similarly, the website beconfidant.com offers a service directed to online data organization with controlled access. Further, U.S. Pat. App. No. 2003/0208490 (Larrea) is directed to a system and method for improved data storage, control, and/or access. Additionally, the website healthvault.com provides a service to organize, manage, and share family health information.

SUMMARY

With reference to the corresponding steps, parts, portions, or modules of the disclosed embodiments, merely for the purposes of illustration and not by way of limitation, a database for online personal information management is provided comprising: a first account, a first database user id, a second database user id associated with the first account, a set of data nodes which are interlinked to form a graph, and a data object having an associated node an associated account and an object owner. The database contains at least one share right object associated with a node, and the share right object has a parameter indicating whether the share right object is active when the owner is alive or when the object owner is deceased.

The database may contain a plurality of accounts. The database may have share right objects associated with a given account and a given database user id. An edit right object may be associated with a data object. The edit right object may be associated with an account and a user id. The edit right object may be associated with a node. The database graph may have a plurality of hierarchical levels.

A data object may contain links to: an optional reminder, an optional note, and an optional file attachment. A data object may further contain a status flag indicating whether the data object is deleted or not. A data object may also contain a last updated date.

A share right object may include a status flag indicating whether the share object is deleted or not.

An edit right object may include a manager flag indicating whether the associated user id can create data objects in the given account.

The graph may contain a parent node for personal information, a parent node for medical information, a parent node for financial information, a parent node for insurance information, and a parent node for legal information. The graph may contain nodes organized in three levels.

The database may also contain a status flag for each data object owner indicating whether the owner is alive or deceased.

In another aspect, a method for personal information management with controlled access is provided comprising the steps of: providing a server computer connected to a network comprising a repository for storing data objects associated with an account having an associated first user, and an object owner associated with a data object; providing a first user interface for allowing the first user to add a second user and associate the second user to the account; providing a second user interface for allowing said first user to create a share right object associated with a user and data object, and said share right object comprising a flag for indicating whether the share right object is active when the object owner is alive or deceased; providing a third user interface for the first user or the second user to add data objects to the database; determining an alive or deceased status for each object owner; and providing a fourth user interface for allowing a user to access the database as a function of the share right object and the status.

The step of providing a fourth user interface may involve providing access to a data object in a share right object when the share right flag matches the alive or deceased status for the object owner. The method may further comprise the step of providing a fifth user interface for allowing the first user to create an edit right associated with a user and a data object. The method may further comprise the step of providing a report interface for creating customized reports as a function of a filter. The filter may be comprised of custom database fields selected by a user.

The method may further include the step of providing an emergency interface which provides access to specified data objects when an access code is provided. The specified data objects may be medical data. The access code may be a matrix code. The access code may provided on an emergency medical card.

The method may further contain the step of encrypting the repository. The user interfaces may be html interfaces.

In another aspect, a system is provided for online personal information management with controlled access comprising: a server computer; a database for storing a data object associated with an account and an owner; a user id associated with the account; a share rights object for determining share rights associated with an object and a user id; the share rights object having a flag indicating whether the share right object associated with the object and the user id is active when the object owner is alive or when the object owner is deceased; a network user interface, the network user interface providing access to the data object as a function of the user id and the share rights object.

The system may further contain a set of data nodes interlinked to form a graph. The data object may have an associated node. The system may also have an edit right object for determining edit rights associated with an object and user id. The edit right object may be associated with a database node within a graph of database nodes. The data object may further contain links to an optional reminder, an optional note, and an optional file attachment. The data object may also have a status flag indicating whether the data object is deleted or not. The data object may also have a last updated date.

The share right object may further contain a status flag indicating whether the share right object is deleted or not. The share right may further contain a manager flag indicating whether the associated user id can create data objects in the account.

The graph may contain a parent node for personal information, a parent node for medical information, a parent node for financial information, a parent node for insurance information, and a parent node for legal information. The hierarchical database may contain nodes organized in three levels.

The system may further contain a status flag for the data object owner indicating whether the owner is alive or deceased. The system may further contain a user interface for creating customized reports using a filter. The filter may be customizable by a user. The system may further comprise an emergency user interface which provides access to specified data objects when an access code is provided. The specified data may be medical data. The access code may be a matrix code. The access code may be provided on an emergency medical card.

The system may further contain an encryption engine for encrypting and decrypting data.

While examples of the preferred embodiments of a system, method, and database for online personal information management have been disclosed, the disclosed embodiments are subject to various modifications and alternative forms. It should be understood, however, that the detailed description is not intended to limit the system, method, and database for online personal information management to the particular embodiments which are described. This disclosure is instead intended to cover all modifications, equivalents and alternatives falling within the scope of the claims.

BRIEF DESCRIPTION OF THE DRAWINGS

Figure 4:
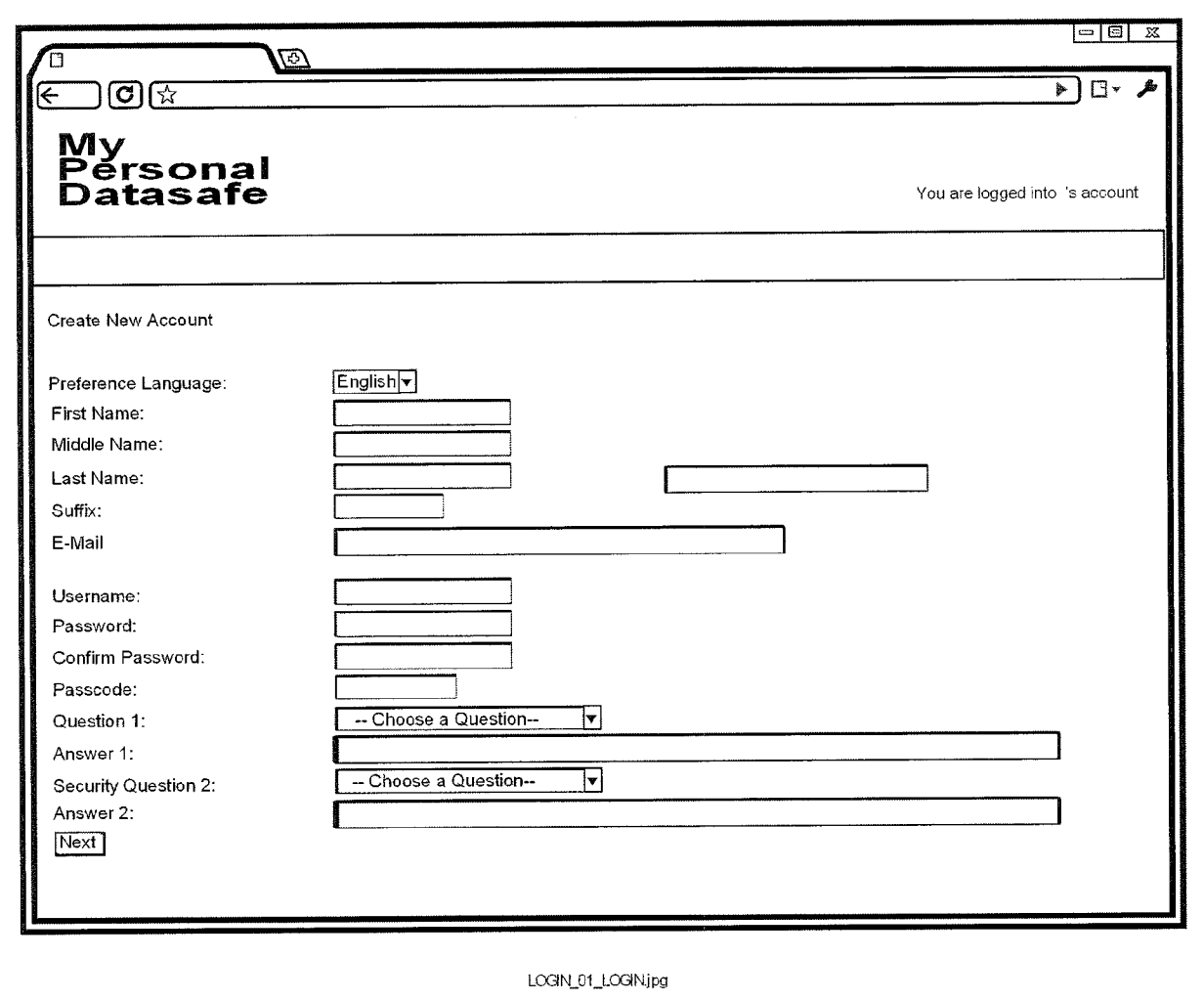

FIGS. 3-4 are the page views provided from the first embodiment system during user account creation.

Figure 12:
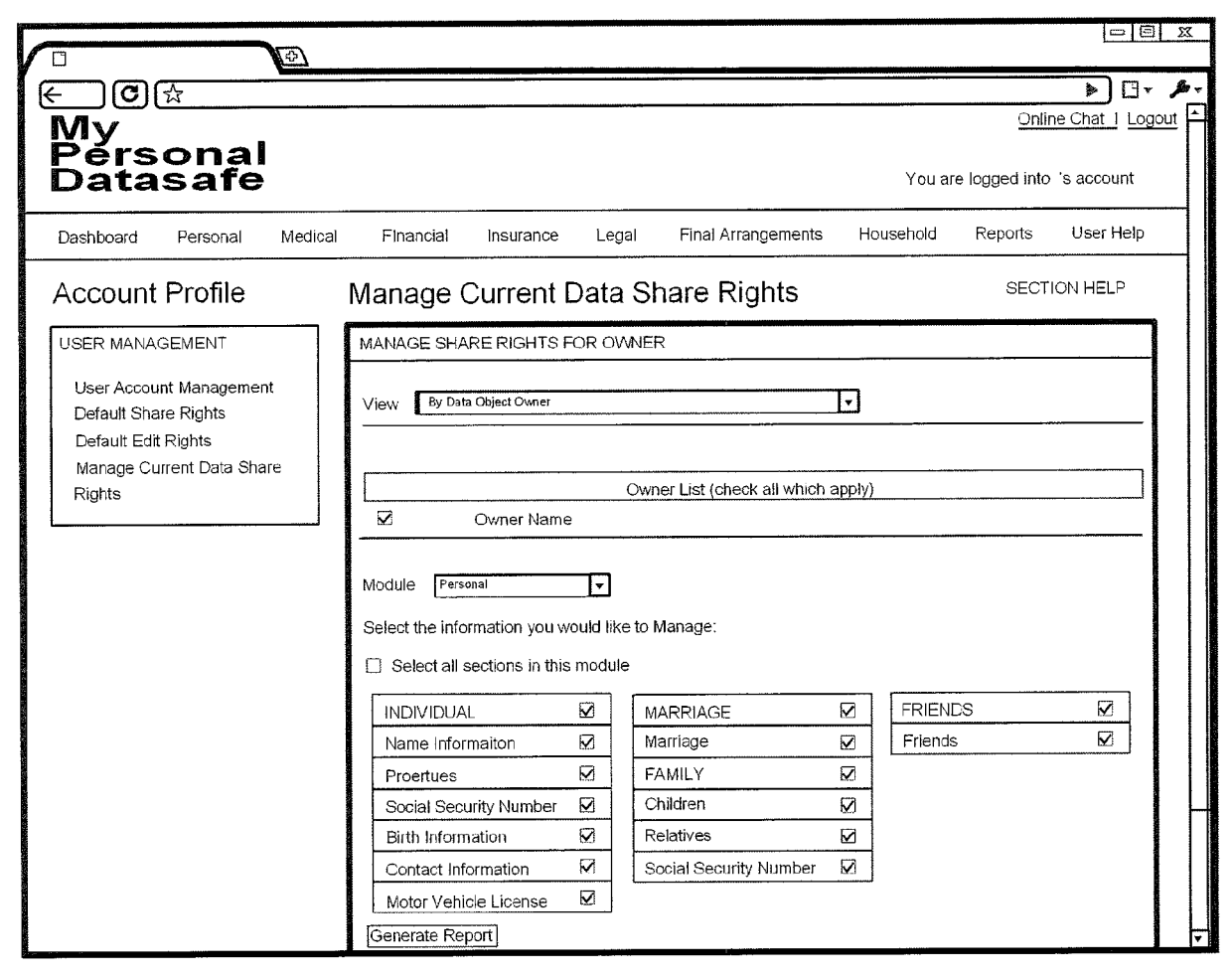

FIG. 12 is the page views provided from the first embodiment system for the process of changing user share rights.

FIG. 19 is the page views provided from the first embodiment system for the process of generating emergency reports.

DESCRIPTION OF THE PREFERRED EMBODIMENTS

Figure 1:
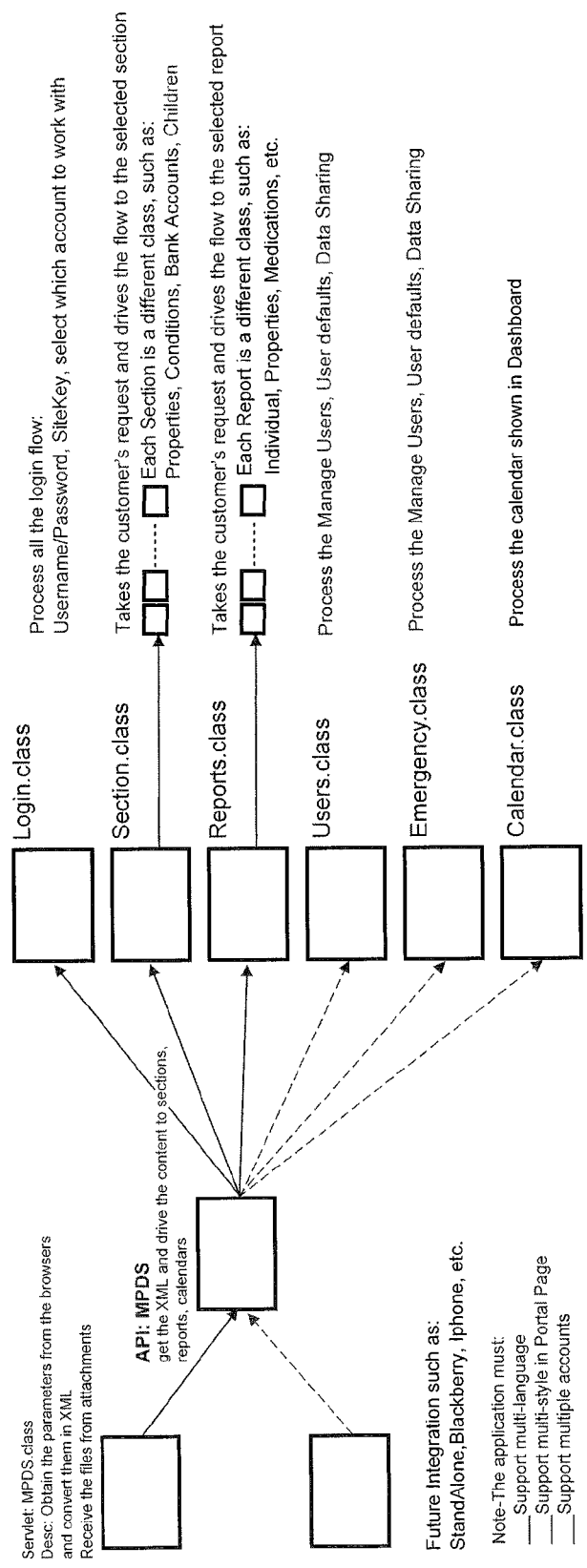
FIG. 1 is a flowchart view of a first embodiment system architecture.
Figure 2:
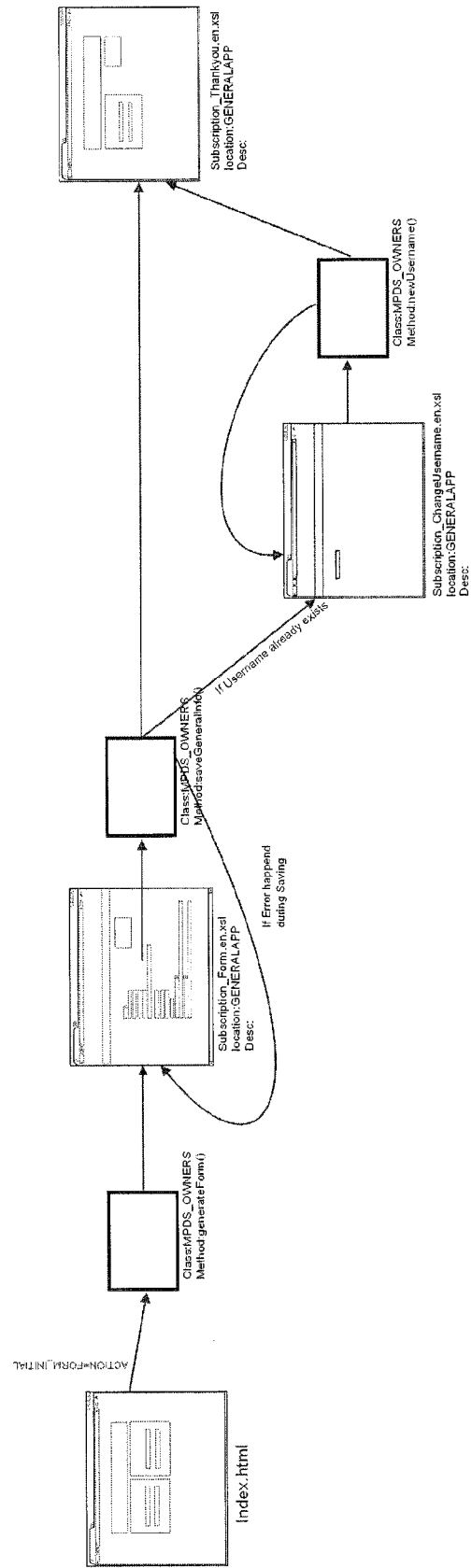
FIG. 2 is a flowchart of the steps in creating a user account in the first embodiment.
Figure 3:
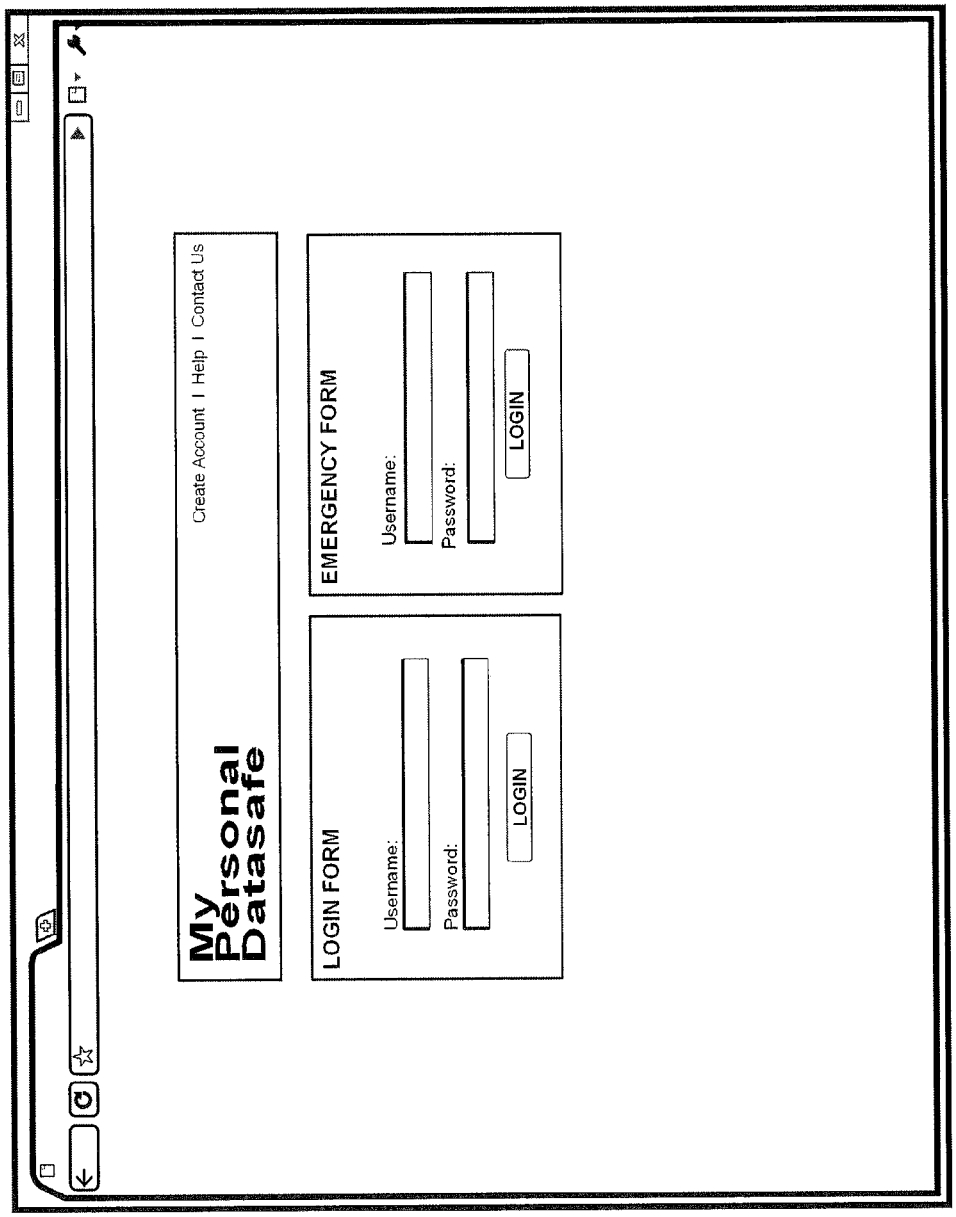
Figure 5:
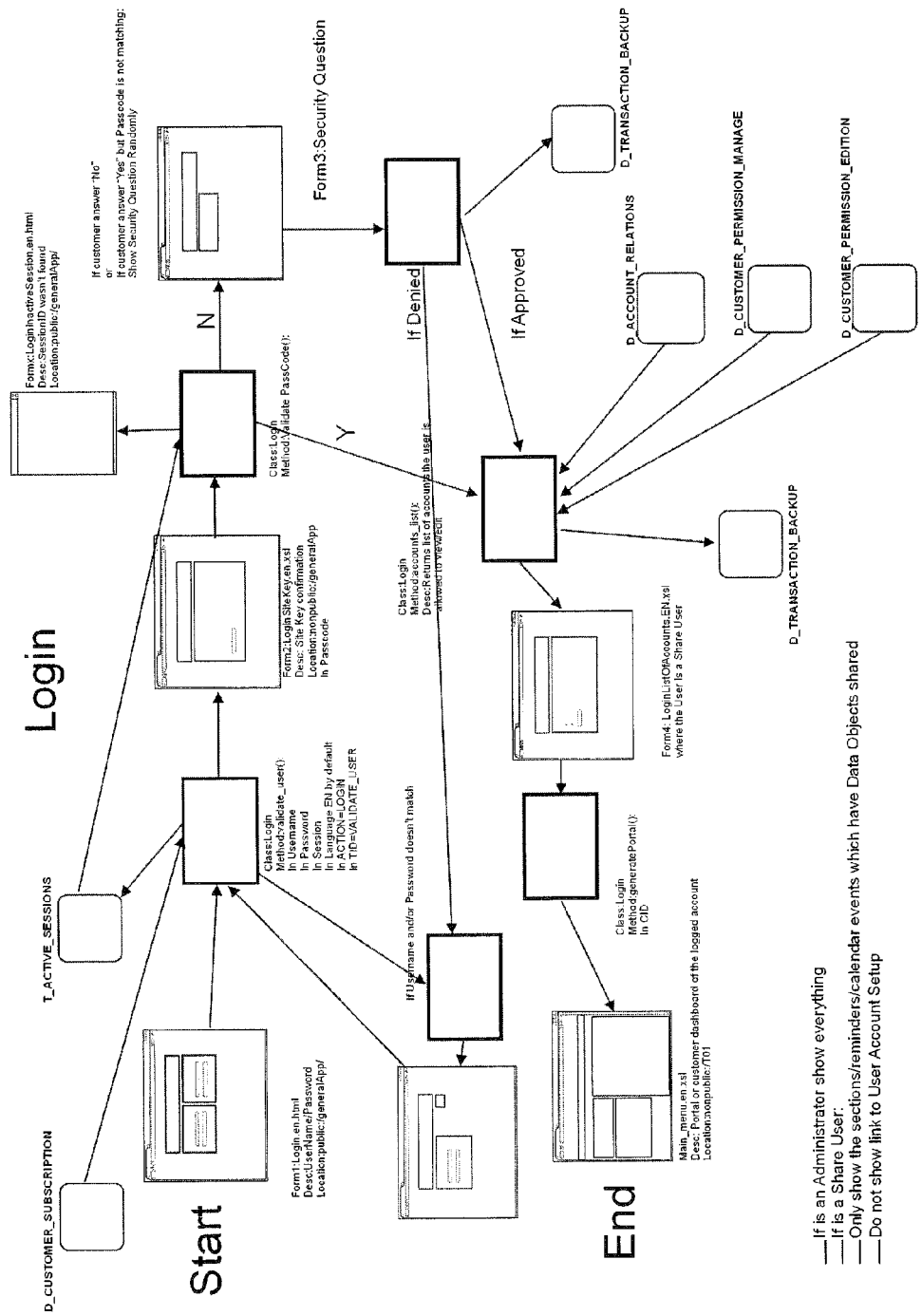
FIG. 5 is a flowchart of the login process in the first embodiment.
Figure 6:
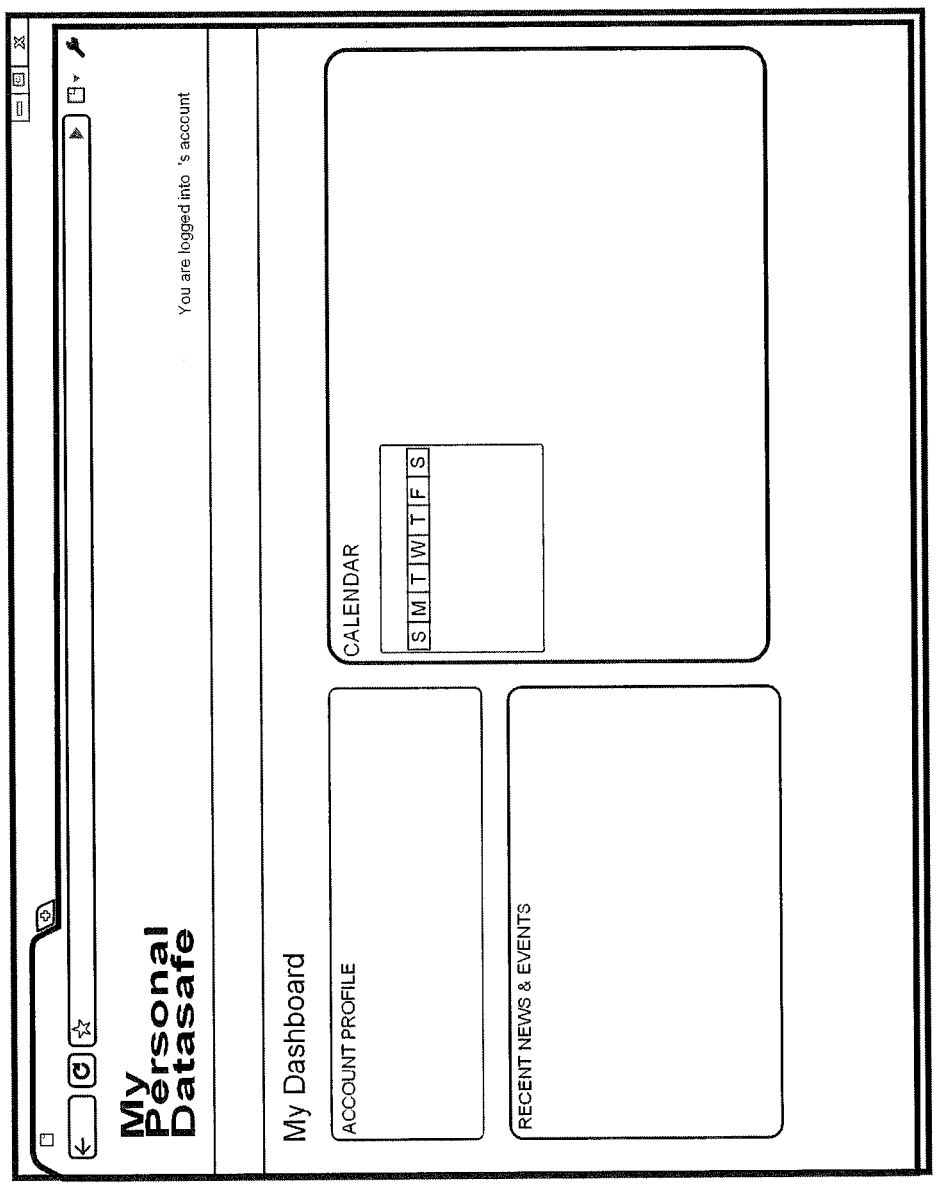
FIG. 6 is the dashboard page views provided from the first embodiment system.
Figure 7:
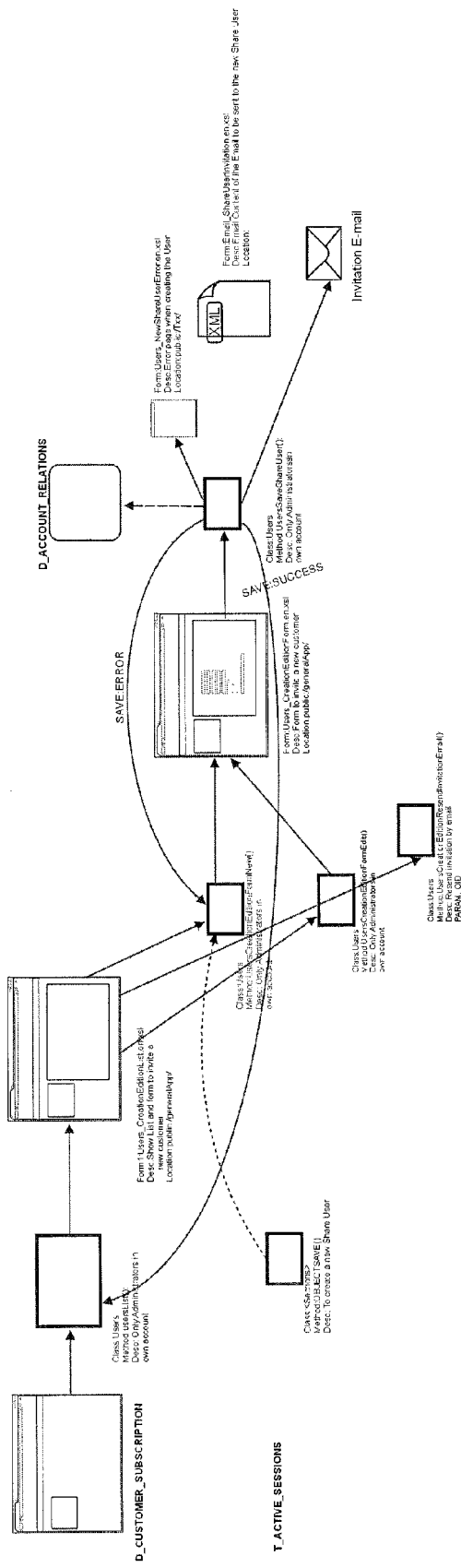
FIG. 7 is a flowchart of the account user management process in the first embodiment.
Figure 8:
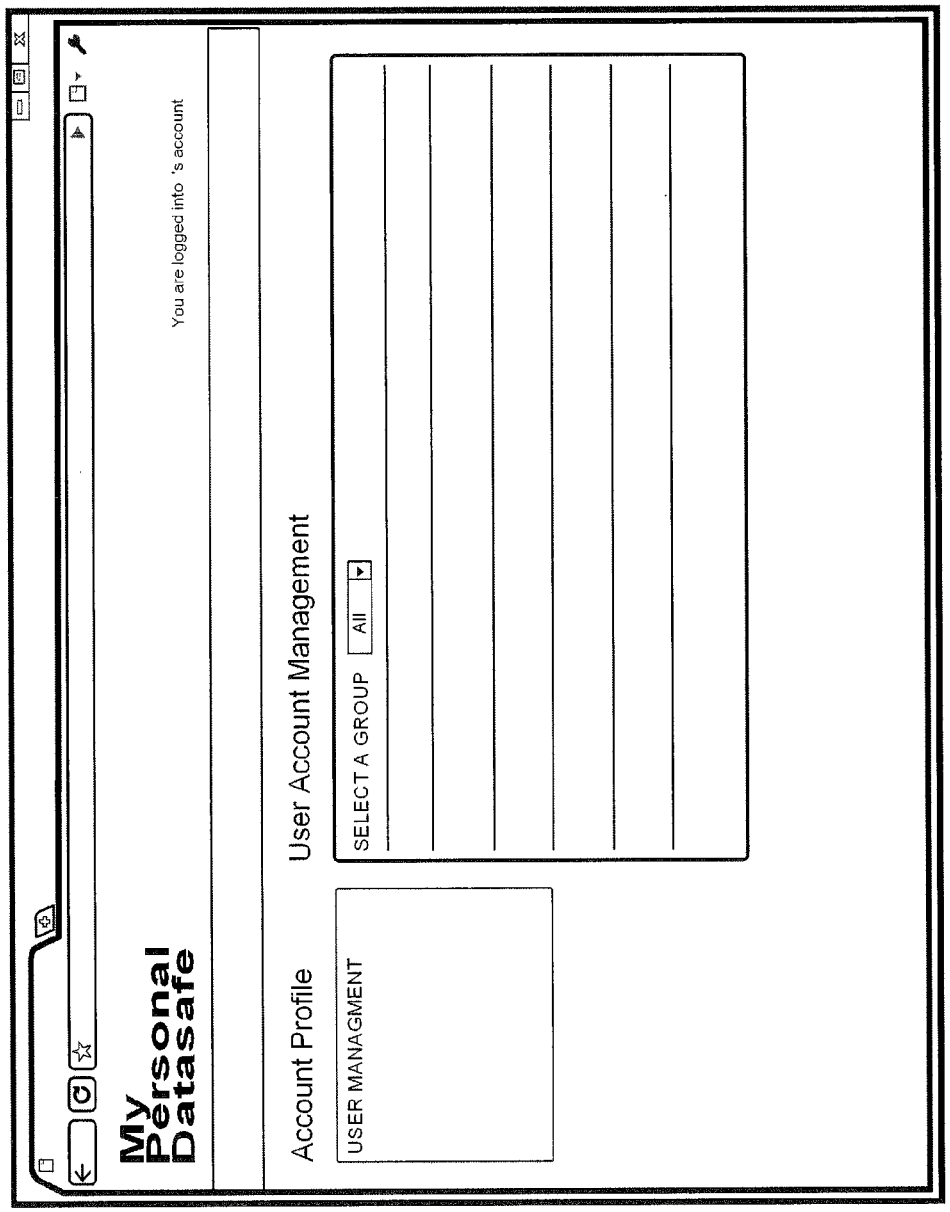
FIG. 8 is the page views provided from the first embodiment system during the user management process.
Figure 9:
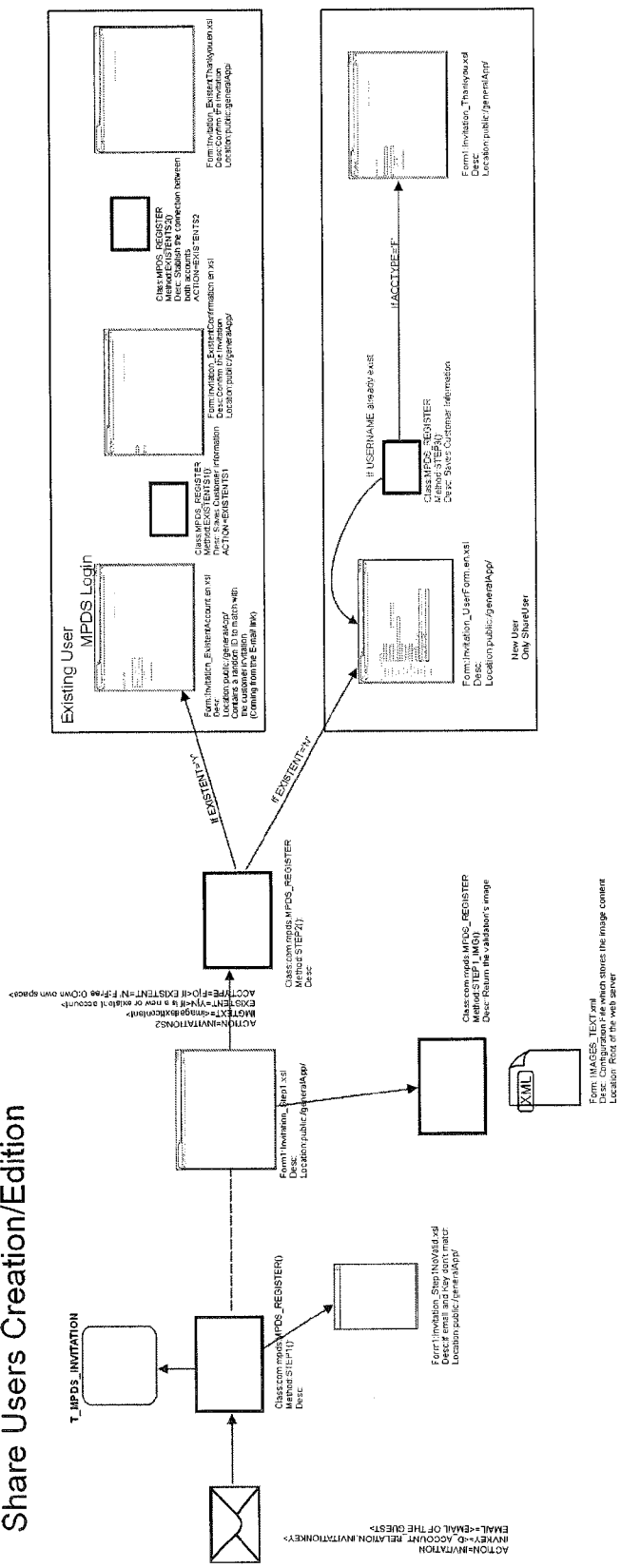
FIG. 9 is a flowchart of the user invitation and acceptance process in the first embodiment.
Figure 10:
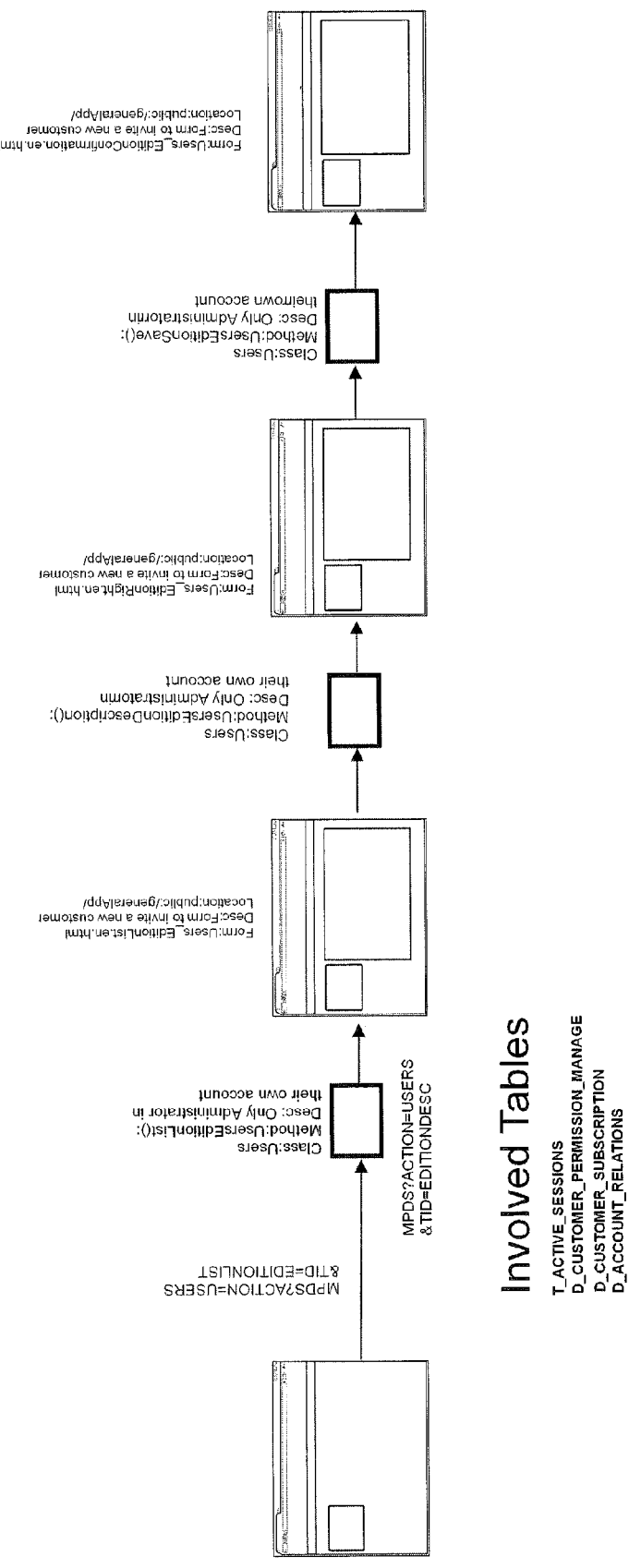
FIG. 10 is a flowchart showing the default edit rights change process in the first embodiment.
Figure 11:
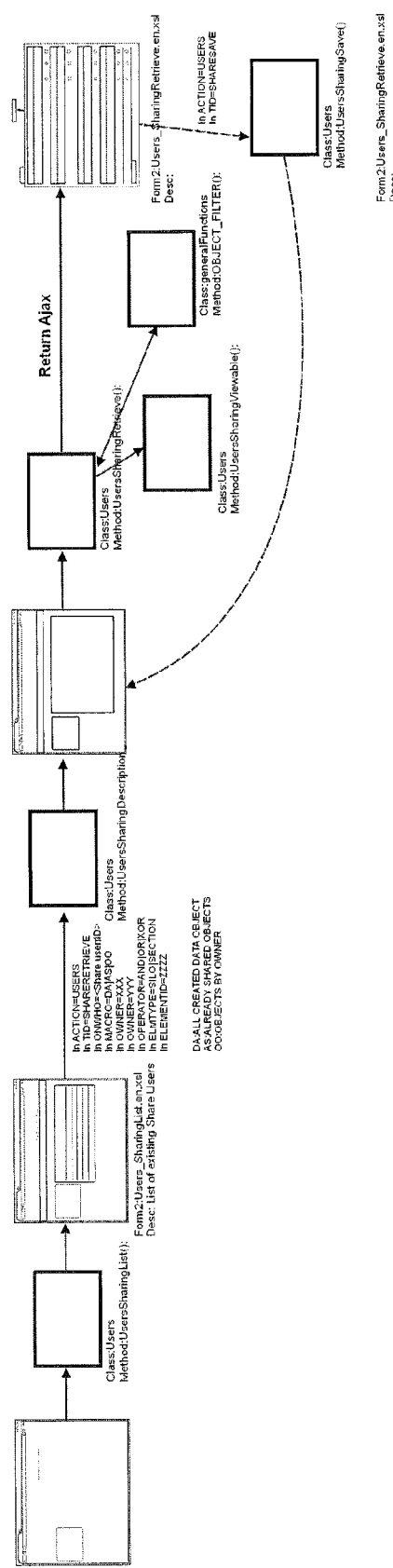
FIG. 11 is a flowchart of the user share rights change process in the first embodiment.
Figure 13:
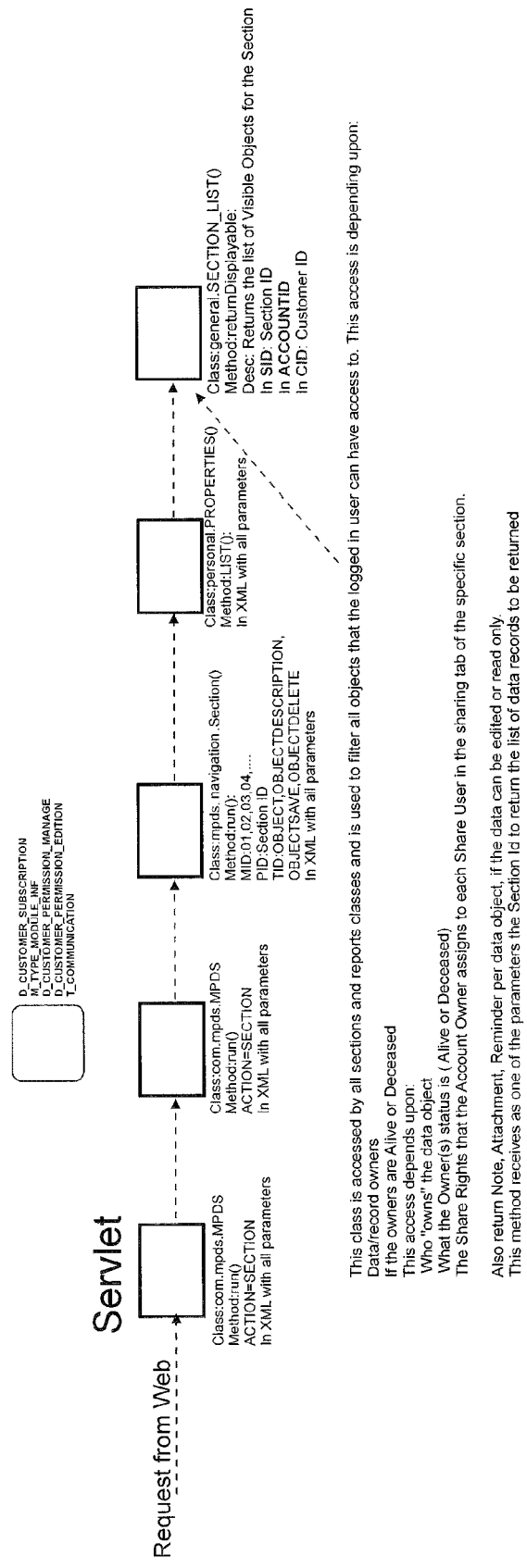
FIG. 13 is a flowchart of the section navigation flow.
Figure 14:
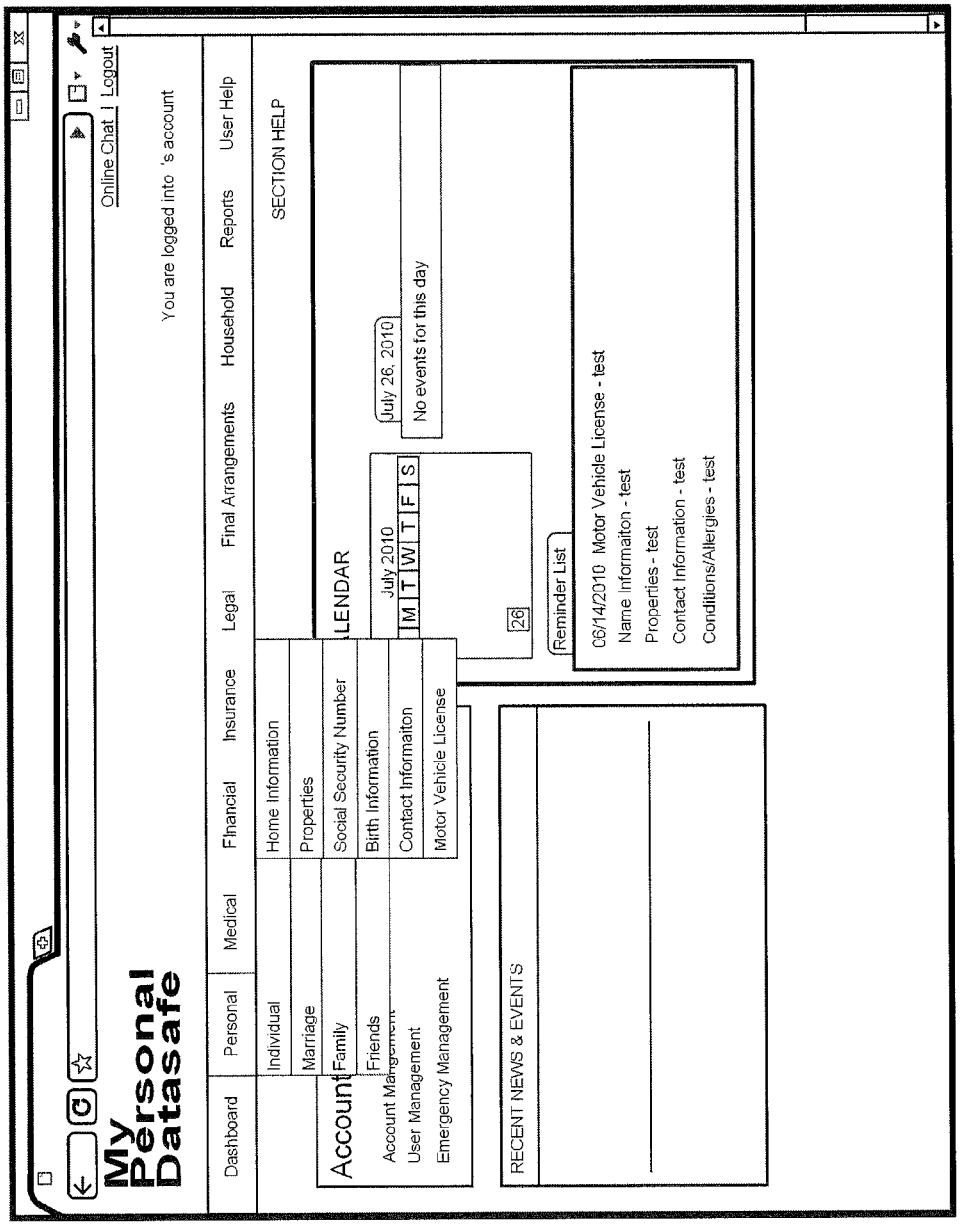
FIG. 14-15 are the page views provided from the first embodiment system for navigation flow.
Figure 15:
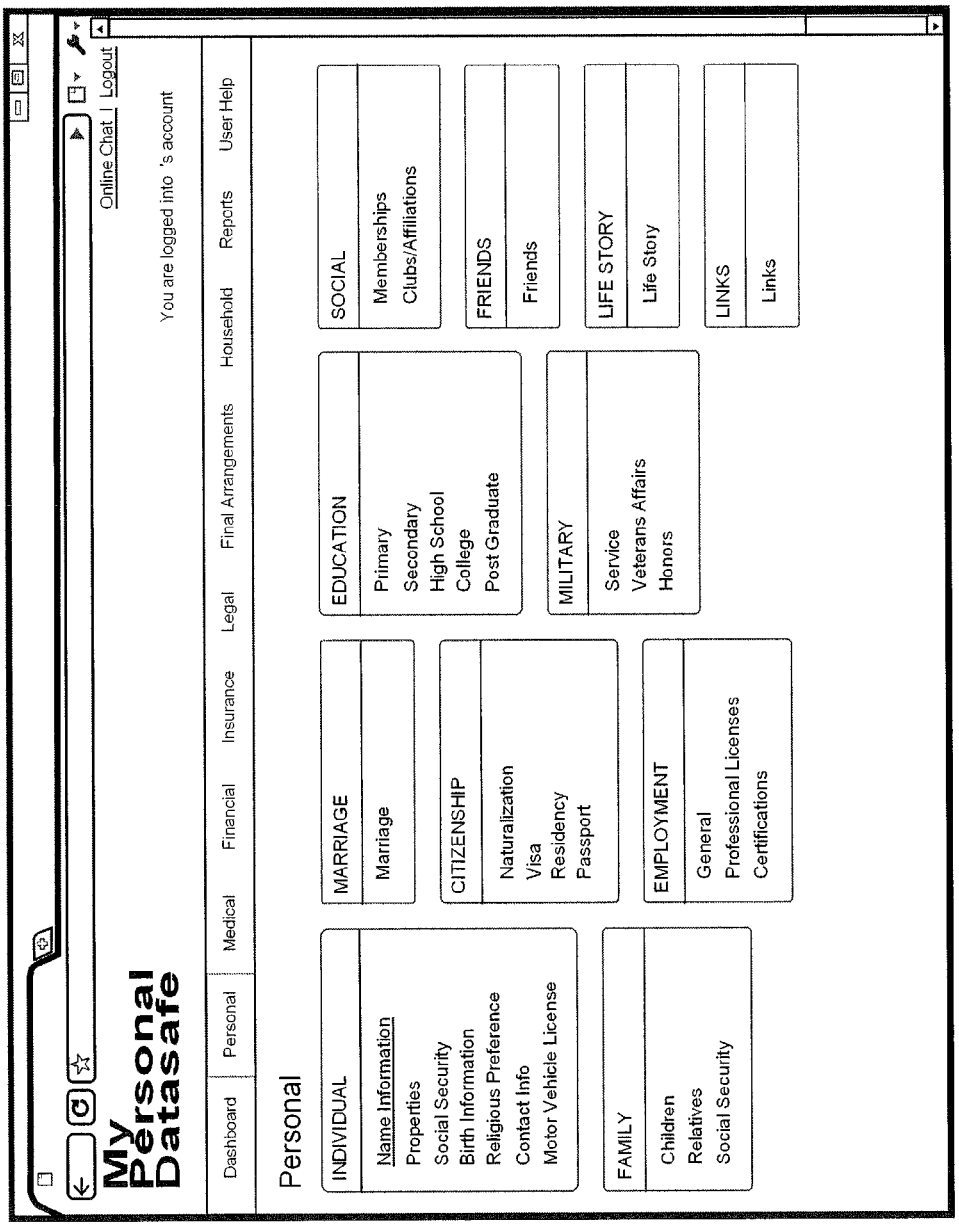
Figure 16:
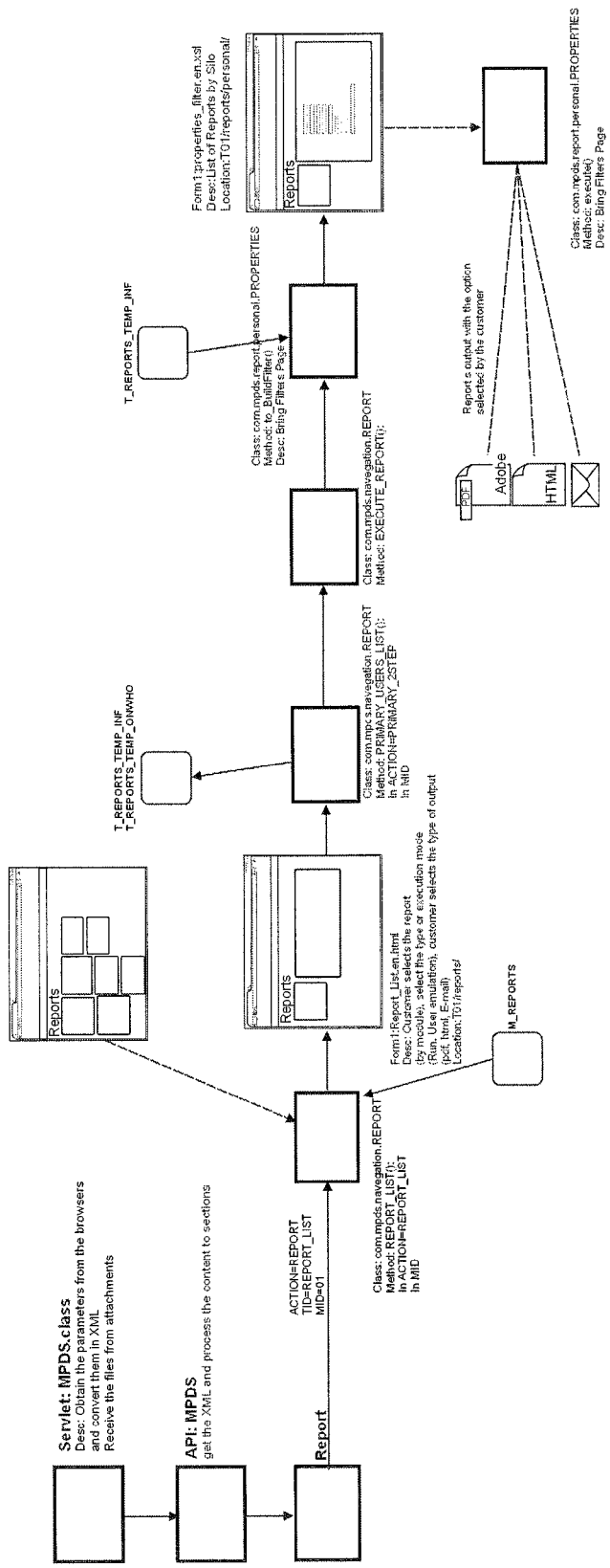
FIG. 16 is a flowchart of the process of generating reports in the first embodiment.
Figure 17:
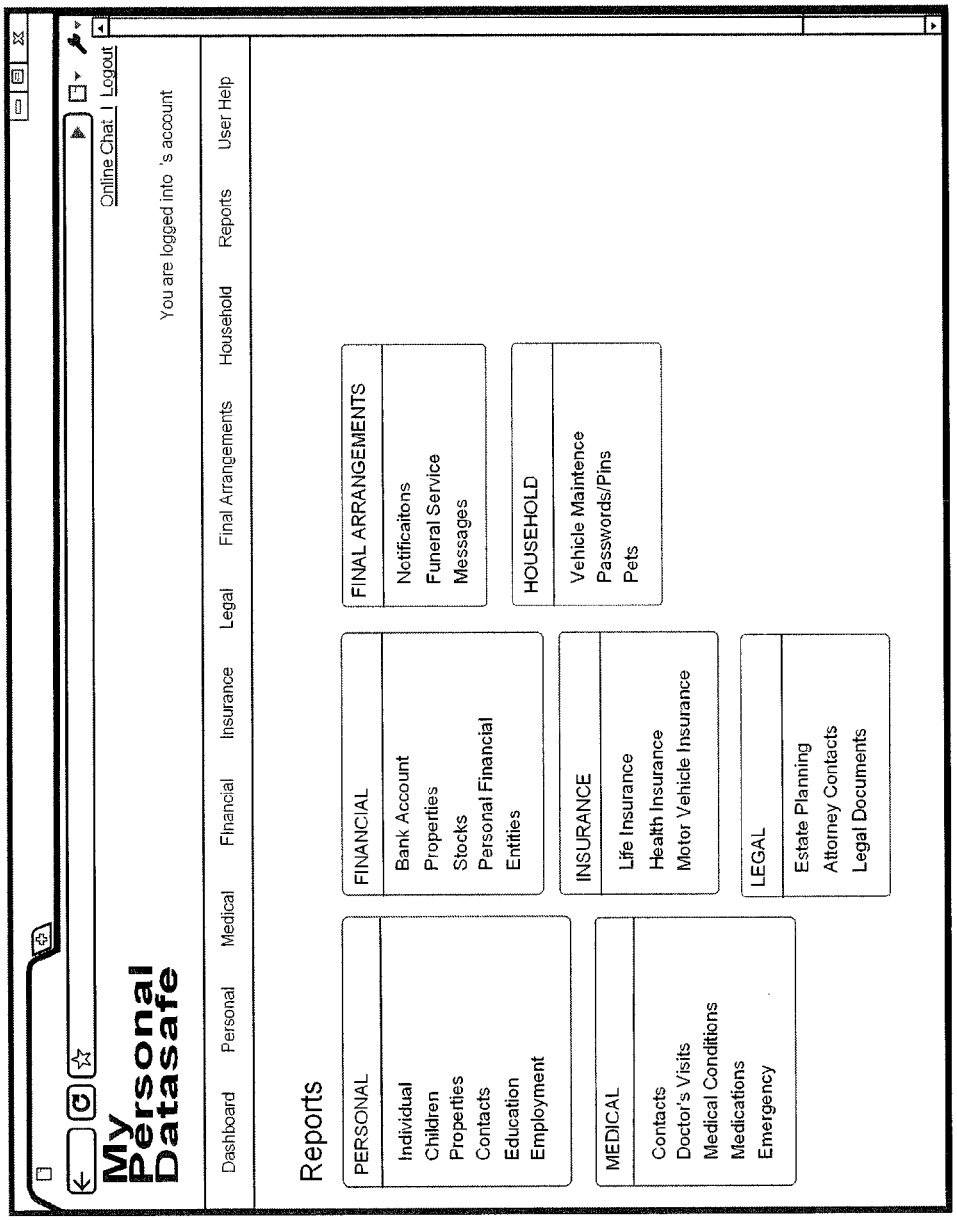
FIG. 17 is the page views provided from the first embodiment system for the process of generating reports.
Figure 18:
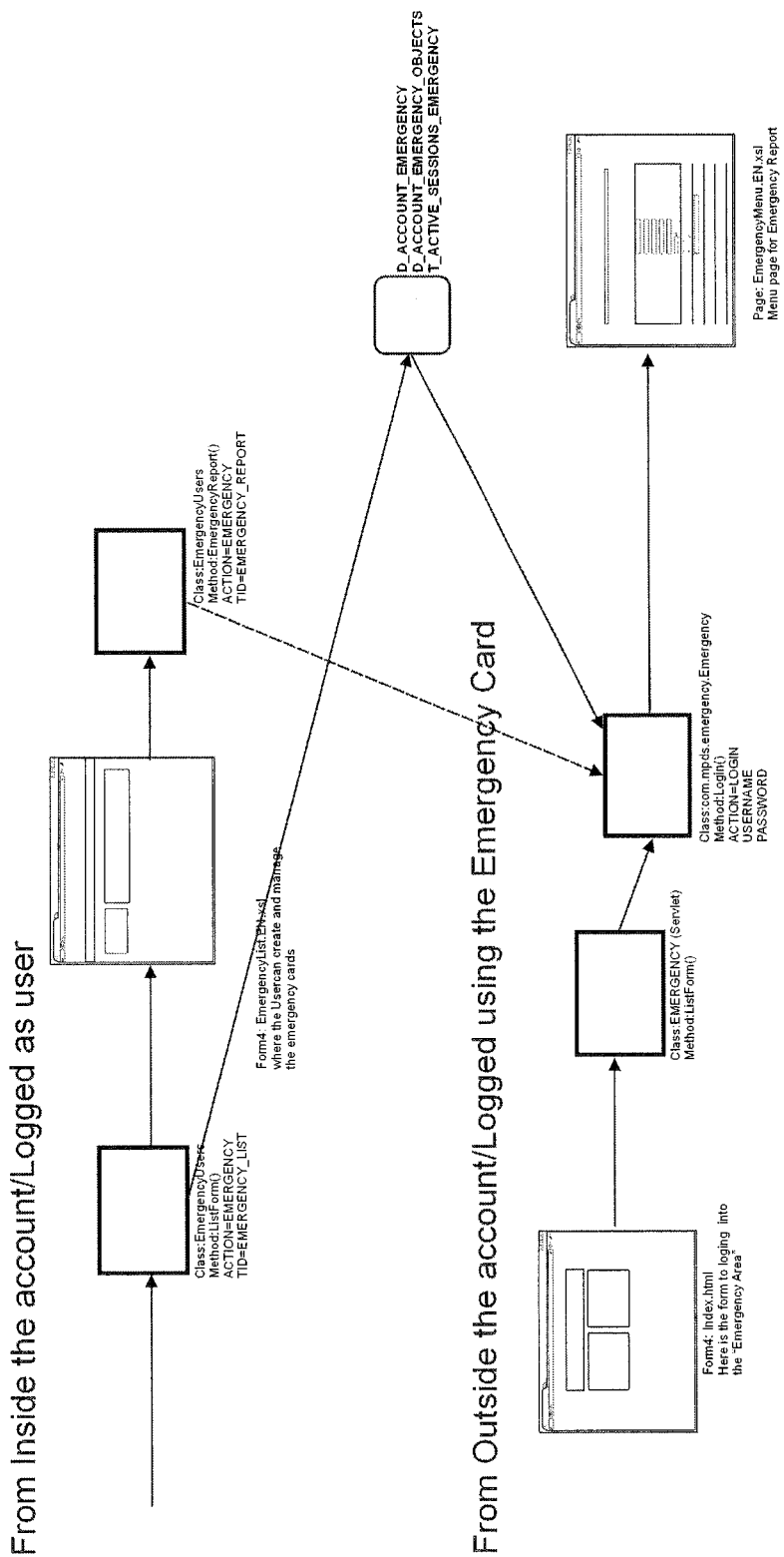
FIG. 18 is a flowchart of the process of generating emergency reports in the first embodiment.

At the outset, it should be clearly understood that like reference numerals are intended to identify the same elements, steps, parts or portions consistently throughout the several drawing figures, as such elements, steps, parts or portions may be further described or explained by the entire written specification, of which this detailed description is an integral part. Unless otherwise indicated, the drawings are intended to be read together with the specification, and are to be considered a portion of the entire written description of this invention. The following description of the preferred embodiments of the present invention are exemplary in nature and are not intended to restrict the scope of the present invention, the manner in which the various aspects of the invention may be implemented, or their applications or uses.

A matrix code is defined as a two dimensional code such as a quick response code (QR code), a 2D bar code or other similar code. A database is defined as a structured set of data held in a computer, including a relational database such as Microsoft SQL, or another similar database. A database may also be a simple file or an electronic folder. A user id is defined as a unique identifier used to specify a user of a computer system. A user id may be a number or a memory address. An emergency medical card is defined as a card which contains medical information.

A first embodiment is directed to a method of providing an online system allowing individuals ("Subscribers" or "Administrators") to store and share their personal information online. The method further provides an extensive set of access controls to limit specific data access based on who is accessing the particular data, and when the access is being attempted.

The general structure of the first embodiment includes an Internet application within a client-server model with a database implemented on a server computer. The application running on the server computer allows client computers to access data over a secure html interface using a standard web browser. The software is implemented in ASP, java, XML, and Microsoft SQL as the database. FIG. 1 shows the basic system architecture of the first embodiment. There are two primary users of the system: "Subscribers," who are the paying customers in charge of an "Account," and "Share Users," individuals who are given data access rights by Subscribers.

Data is either input manually, for example typing text into html forms, or is uploaded as a file. Each data element is wrapped in a database data object which is linked within the database to an Account object. Data objects are organized/linked hierarchically into top level "MODULE"s (Modules), mid-level "SUB_MODULE"s (also called Categories), and lowest level "TYPE_MODULE"s (also called Sections). Each data object has an associated set of access rights. Access rights specify which Share Users have access to a given data object and whether that access is only for when the Subscriber is alive or deceased. Additionally, access rights can be made specific to each Section of the data hierarchy.

Eight data Modules are implemented for top level specific data classes including: personal, medical, financial, insurance, legal, final arrangements, household, and reports. Each module has its own set of unique submodules, and each submodule has a unique set of sub elements. An outline of the complete data hierarchy and their associated names is shown in Appendix I.

In the general operation of the first embodiment, a Subscriber will upload data into as many of the Sections in the data hierarchy as he/she pleases. The Subscriber then sets up a number of Share User accounts which are associated with the Subscriber account. For each Share User, the Subscriber is capable of specifying the specific access rights to data in the account. More specifically, access rights for an individual user may be specified at the module level, at the submodule level, or for individual data objects. Additionally, the access rights can be made contingent upon whether the subscriber is alive or deceased.

Information is accessible anytime from any Internet enabled device, such as a computer or PDA, through a common web browser interface. A Subscriber may upload/edit the account data only by himself, or he may also give upload editing rights to a designated Share User. If this editing privilege is given, the Share User by default is limited to edit only the information and data that they upload/input. At all times the information/data a Share User inputs/uploads will be visible to the Subscriber.

Share Users may help the Subscriber retrieve data in an emergency or crisis situation. Additionally, a Subscriber can input information for an individual other than the Subscriber into the system (e.g. Subscriber may be executor of a person who doesn't have an Account or someone who didn't share information yet.) Share Users can also execute reports. The reports and data that Shared Users can see by default is limited to the data that they uploaded. Share Users can also gain access to and manage the Subscriber's information if the Subscriber allows it. This is advantageous in situations where individuals may buy a first embodiment Account for someone else as a gift.

A person may buy may buy and renew subscriptions for multiple Accounts. The Subscriber is not necessarily a Share User for the account(s) they bought. An account may be locked for "Read only" for a finite period of time if the subscription expires or if the Account Owner is determined to be deceased.

The first embodiment system has two types of users: Subscribers and Share Users.

The Subscriber (Administrator) has all permissions across the application (Create/Edit/Delete/Designate Share Users). The Subscriber is the only user who can assign privileges to the rest of the users created within the Subscriber's account. Also, this is the only type of profile with privileges to manage Share Users. By default everything "belongs" to the Subscriber. The Subscriber is the only one to assign the share rights of the information data objects, regardless of who inputted the information.

The Share Users are created by the Subscriber. Share Users may be granted access rights to a particular Data Object (e.g. Children, Parents, Friends, Executor.) These users can only execute reports and can only see those Data Objects that have been shared with them. Share Users can see the Data Entry fields of the shared data objects without having the rights to save or make changes, and without seeing the other Share Users. Share Users can only see those Data Objects that have been specifically shared with them (Front door), in addition to the Report Option which by default is granted. Share Users can manage (edit) information when the access privilege is granted by the Subscriber. Share Users can have access to multiple accounts (e.g. a doctor may be a Share User for multiple accounts). Multiple Subscribers can invite the same person to be a Share User. Anyone logged into the system using their own unique user name and password will have the ability to select which account they want to enter into (e.g. they can choose to go into their own account or any other account that has had information shared with them.) In addition, they have the ability to change from one account to another on the fly. The Subscriber can input information that belongs to his share users. Access may be made contingent upon whether the Subscriber is alive or deceased (using a "While Alive" and "After Death" data field tag). This data access control information is tied to a specific user, thus, the Subscriber can change the Share User's status to be given access based on whether the Subscriber is deceased or not. For example, a Share User with only "After Death" access will not be able to see any data until the Subscriber is deceased. When a Subscriber passes away one of the Share Users can be designated as the new Subscriber. The Data Objects which belong to Share Users can be subject to While Alive and After Death share rights as well. To add a Shared User to the account, the Subscriber will send an invitation thru the system via E-mail to whomever the Subscriber wants to be a Share User. This will create or associate an existing account with the Subscriber's account. A second field is used to indicated when the email is validated. Various data entry forms are set up to not accept a value from "paste" action. The Share Users can also be created within the application from the sections where contacts are created (e.g. Parents, children, friends, physicians, etc.).

In the first embodiment, there are four levels of privileges, each having four separate options. The levels are: Highest Level (Full access to all data within the system), Per Module Level (Personal, Medical, Financial, Insurance, Final Arrangements, Household Maintenance), Per Section Level (e.g. all Properties, all Medications, etc.), Per Data Object Level (e.g. specific property, specific medication, etc).

The options per level are: Manage their Data Objects, Edit their share rights, Manage somebody else's Data Objects, Edit somebody else share rights.

In the Manage their Data Objects option, the selected Share User can only manage his own Data Objects. By default, such a user will not have the privilege to assign share rights to other Share Users and other Share Users will not be visible. Further, all information created is visible for the Subscriber, including objects created by the Subscriber that are jointly owned with a Share User and where the object was shared by the Subscriber.

In the Edit their Share Rights option, the user will be able to manage the share rights to only the Data Objects created and owned by him/herself. This option will apply only if the "Manage their Data Objects" option is checked.

In the Manage somebody else's Data Objects option, a list of the existing Share Users and the Administrator will have the ability to assign "manage rights" to the Share User based on several different factors such as: the Data Object itself, who owns the data object (i.e. who's information it is), alive or deceased status, etc. This ability can be given at a global, module, section or data object level. This option will allow a Share User to manage data objects for the selected people from the list. The Subscriber will select from the list of Share Users and will be the only person able to assign these rights. This privilege does not include the ability to assign share rights.

The Edit somebody else Share Rights option provides for management of the share rights to only the Data Objects that are owned by the selected individuals from the previous list. This can apply only if the Manage somebody else data was checked.

In the first embodiment, each of the Sections have the following subparts: List Page, Description Page, and Section Help. In presentation, the screen is divided in two parts: (1) the first part (top) contains the list of previously created Data Objects (List Page), and (2) the second part contains where new data objects are created or edited (Description Page).

The List Page contains: a Navigation Menu, a Section Help Link, Chat Support, a Button to Clean the Data Entry Form, and a Table with the List of existing Data Objects created. The Table shows: the Owner of the data; data that needs to be sortable by different criteria; a Fields Key to the section; Icons if data Object has Note, Attachments, or Reminder; an Option to edit and delete; and the last time updated. If a Data Object is deleted, there will be a record where this action can be reported to only the Administrator in the portal page. If a Section contains a field with a specific date that is determined should be reflected on the calendar, then the system will key off that field and show the data object on the calendar. (e.g. Birthday, Anniversary, etc.) These are visible on the Share Users calendar based on the share rights assigned to that data object.

The Description Page has a Data Entry Part, an Ownership part, and a Permissions Rights Part. The Data Entry Part is the area where users (Administrator and granted Share Users) fill in the fields with the information related to the Section. The Ownership Part contains the data belongs to Administrator by default or ownership can be assigned from a drop down list of the Share Users. The Permissions Rights Part is where the information entered in the Data Entry Part is shared with the Share Users. The Permissions Rights Part has two possible scenarios to be activated or visible for these Share Users: While Alive and After Death.

In the While Alive scenario, the Information is visible if the Person who "owns" the information that has been entered in the Data Entry Part is alive and the information has been shared with the selected Share User. If the information belongs to multiple owners then this rule applies as long as one of them is still alive. If user selects the option share while alive then the after death option is automatically selected.

In the After Death scenario, The information selected as after death applies if the data owner is deceased. In a case where the data belongs to multiple owners, then all owners need to be deceased to make this information visible to the Share Users. A Save popup modal will appear that lists all the share permissions while alive and after death selected. This is a "final warning" to the customer of who can see the information and who can edit it.

In "Portal Page" or "Application Home Page" there is a link where Administrator can select a Share User and bring as a summary page from all sections the Data Objects within the selected sections and the Permissions assigned to the selected Share User. In addition, the Administrator needs to have the ability to reassign the share rights "on the fly" rather than having to go into each individual data object to change the respective share rights.

TABLE 1

Example Share Rights

| Section | Belongs to | Summary | While Alive | After Death |
|---|---|---|---|---|
| Name | John Doe | John Doe | Yes | Yes |
| Name | Gina Doe | Gina Doe | No | Yes |
| Social Security | John Doe | 111-11-1111 | No | Yes |
| Property | John Doe | 6727 S. Lois Ave | Yes | Yes |

Note: If an Administrator User wants to add a new "Shared User" (OU) from the current input section, this can be linked to the page to create the user and once finished it then this needs to automatically go back and continue filling the section where he/she was.

However, if the section is related to a contact. E.g. Friends, Children or relatives, Professionals such as doctor, CPA, attorneys, then a checkbox needs to ask if the Administrator wants that person to be a "Share User" then a sub-form will be show in that section to complete the process and will leave the page to create the share user invitation.

A Reminder is a field part of the Data Entry and will be displayed in the My Dashboard page to remind the Administrator for a specific action. E.g. Search for a document, scan document, and update pictures. It can also be scheduled to a specific day. Because the reminder is related with an action, this is considered private to the person who manages the Data Object (record); however there will be a checkbox to allow this information to be visible to the rest of the share users to whom this information has been shared. If the Reminder has a maturity date set up, then the Account Owner and the data owner will receive an e-mail with the notification. Also specific sections will be sent to the email of the share users.

Notes can be entered via a free data text entry box where the customer can type anything they want. Attachments in the form of files can be uploaded and related with the inputted Data Object. Features across the Application include multi-language support, increase or decrease font dynamically, and multi style templates.

The Section Help contains an information to guide the User on how to fill in that specific section and what the purpose of the section is. Each Section's Section Help contains: a general description of the section, an explanation of how to use the section, a listing of related Sections or Sections that are going to be affected if a record is deleted (e.g. if a medical condition is deleted then it will affect Surgery if this has been associated with the deleted medical condition), and Reports where the section information can be found.

In the Reports, various different filters can be set up that allow the user to pull the reports information in a filtered manner. This will allow the user to focus on just the specific information they want to see in the report. Again, Share Users will only see the data in this report that has been shared with them by the Owner.

Additional general features of the system include: a Calendar, this will show per month the data that needs attention and what has been input in the sections (e.g. Driver License renews Doctor's Visit follow up, Rent Due.); Latest Activities in the account, this will show who made changes and what Data Objects were changed recently (e.g. Create, Update, Delete.); Shared Objects per Share User, Overview, this page will come up after you select a share user and will return all objects that have been shared before and after death; Global share users rules, which create a picture or snapshot of the instant scenario and apply rules for future objects for levels APP, Section, Sub-Section and will also be able to be filtered by owners list checkbox with AND (for all checked where means joined) and OR (where either one or the other or all checked); Data migration from one account to a new account, in which a Share User receives their own Subscriber account and can import information from another Subscriber's previous account to the new one; and an API to insert data from external applications to Accounts e.g. Doctor's want to establish a next follow up visit. Since the medical applications are going to be consolidated, an API can be written that can receive from these various entities the data related to their patients and put it in a temporary table waiting for the MPDS customer to approve and import and include it as part of their Data Objects. Additionally, Chat may be provided as a general feature in each section in which users can be assisted via live chat. Finally, a "Manage all Attachments" page is provided where users are given a list of all attachments associated with the account. In this page, a table is used to shows the section that each attachment applies.

The first embodiment also provides various Customer Service features. For example, pages are provided to: renew Accounts by processing Credit Cards, change credit card to be charged in association with an account, activate "After Death" features in accounts, Verify Account Status, Cancel Accounts. Additionally, the Customer Service features include a page for opening troubleshooting tickets and making customer service follow ups.

In this system, every single click is tracked and audited. This allows easy creation of Monitor, Auditing, and Statistics data about the system. Other data which is computed and kept track of includes: the number of customers; the Sections visited; the reports generated; the times when transactions occur; the duration between beginning and delivery of the transaction; and the peak times of system usage.

The detailed steps involved in the typical operation of the first embodiment are set forth in Appendix II.

While the presently-preferred embodiment of the method, system, and database for online data storage with advanced access controls has been shown and described, and several modifications thereof discussed, persons skilled in this art will readily appreciate that various additional changes may be made without departing from the spirit of the invention.

The invention claimed is:

1. A method for personal information management with controlled access comprising the steps of:
   providing a server computer connected to a network comprising
   a repository for storing data objects associated with an account having an associated first user, an object owner associated with a data object;
   providing a first user interface for allowing said first user to add a second user and associate said second user to said account;
   providing a second user interface for allowing said first user to create a share right object,
   said share right object being associated with a user and data object,
   and said share right object comprising a flag for indicating whether said share right object is active when said object owner is alive or deceased;
   providing a third user interface for allowing said first user and said second user to add data objects to said repository;
   determining an alive or deceased status for each said object owner;
   providing a fourth user interface for allowing a user to access said repository as a function of said share right object and said status;
   wherein the second user may add data objects into said account while the first user is alive, and
   wherein the alive or deceased status for said first user is verified in response to a request by said second user to add said data objects into said repository; and,
   wherein said data objects added by the second user are not accessible to the same second user unless enabled by the first user as a function of said share right object and said status.

2. The method of claim 1 wherein said step of providing a fourth user interface as a function of said share right object and status comprises providing access to a data object in a share right object when said share right flag matches said alive or deceased status for said object owner.

3. The method of claim 1 and further providing the step of providing a fifth user interface for allowing said first user to create an edit right associated with a user and a data object.

4. The method of claim 1 and further providing a report interface for creating customized reports as a function of a filter.

5. The method of claim 4 wherein said filter is comprised of custom database fields selected by a user.

6. The method of claim 1 and further providing an emergency interface which provides access to specified data objects when an access code is provided.

7. The method of claim 6 wherein said specified data objects are medical data.

8. The method of claim 7 wherein said access code is a matrix code.

9. The method of claim 7 wherein said access code is provided on an emergency medical card.

10. The method of claim 1 and further comprising the step of encrypting said repository.

11. The method of claim 1, wherein said user interfaces are html interfaces.

12. A system for providing online personal information management with controlled access, the system comprising:
    a server computer;
    a database for storing a data object associated with an account,
    said data object having an owner having a first user id,
    a second user id associated with said account;
    a share rights object for determining share rights associated with an object and a user id;
    said share rights object having a flag indicating whether said share right object associated with said object and said user id is active when said object owner is alive or when said object owner is deceased;
    wherein said share right object associated with said second user id is configured to provide a second user access to said data object when said object owner is alive;
    a network user interface, said network user interface providing access to said data object as a function of said user id and said share rights object; and,
    wherein a second user data object added by the second user is not accessible to the same second user unless enabled by the owner as a function of said share right object associated with said second user id, and wherein the alive or deceased status for said first user is verified in response to a request by said second user to add said data objects into said repository.

13. The system of claim 12 and further a set of data nodes, said nodes being interlinked to form a graph and said data object having an associated node.

14. The system of claim 12 and further comprising an edit right object for determining edit rights associated with an object and user id.

15. The system of claim 14 wherein said edit right object is associated with a database node within a graph of database nodes.

16. The system of claim 12 wherein said data object further comprises links to a reminder, a note, and a file attachment.

17. The system of claim 12 wherein said data object further comprises a status flag indicating whether said data object is deleted.

18. The system of claim 12 wherein said data object further comprises a last updated date.

19. The system of claim 12 wherein said share right object further comprises a status flag indicating whether said share right object is deleted.

20. The system of claim 12 wherein said share right further comprises a manager flag indicating whether said associated user id can create data objects in said account.

21. The system of claim 13, wherein said graph comprises a parent node for personal information, a parent node for medical information, a parent node for financial information, a parent node for insurance information, or a parent node for legal information.

22. The system of claim 12, wherein said hierarchical database comprises nodes organized in three levels.

23. The system of claim 12 and further comprising a status flag for said data object owner indicating whether said owner is alive or deceased.

24. The system of claim 12 and further comprising a user interface for creating customized reports using a filter.

25. The system of claim 24 wherein said filter is customizable by a user.

26. The system of claim 12 and further comprising an emergency user interface which provides access to specified data objects when an access code is provided.

27. The system of claim 26 wherein said specified digital data is medical data.

28. The system of claim 27 wherein said access code is matrix code.

29. The system of claim 27 wherein said access code is provided on an emergency medical card.

30. The system of claim 12 and further comprising an encryption engine for encrypting and decrypting data.

* * * * *